(12) United States Patent
Wurzel et al.

(10) Patent No.: US 11,549,859 B2
(45) Date of Patent: Jan. 10, 2023

(54) MEASUREMENT APPARATUS FOR DETERMINING A BENDING MOMENT

(71) Applicant: AIRBUS HELICOPTERS DEUTSCHLAND GMBH, Donauworth (DE)

(72) Inventors: Georg Wurzel, Gersthofen (DE); Johannes Fiek, Augsburg (DE); Christoph Gierlich, Bremen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 137 days.

(21) Appl. No.: 17/202,776

(22) Filed: Mar. 16, 2021

(65) Prior Publication Data
US 2022/0065738 A1 Mar. 3, 2022

(30) Foreign Application Priority Data
Aug. 25, 2020 (EP) .................................. 20400015

(51) Int. Cl.
*G01M 5/00* (2006.01)
*B64C 27/06* (2006.01)
*G08B 21/18* (2006.01)

(52) U.S. Cl.
CPC ........... *G01M 5/0041* (2013.01); *B64C 27/06* (2013.01); *G08B 21/182* (2013.01)

(58) Field of Classification Search
CPC ... G01M 5/0041; G01M 5/0016; B64C 27/06; G08B 21/182; G01B 21/32; G01L 3/10; G01L 5/16
See application file for complete search history.

(56) References Cited

U.S. PATENT DOCUMENTS

| | | | |
|---|---|---|---|
| 9,593,668 B2 * | 3/2017 | Delport | F03D 7/024 |
| 11,448,195 B2 * | 9/2022 | Mai | F03D 80/40 |
| 2010/0095788 A1 | 4/2010 | Mast et al. | |
| 2010/0114504 A1 | 5/2010 | Doleschel et al. | |

(Continued)

FOREIGN PATENT DOCUMENTS

| | | |
|---|---|---|
| DE | 102009021557 A1 | 11/2010 |
| EP | 1317663 A1 | 6/2003 |

(Continued)

OTHER PUBLICATIONS

European Search Report for European Application No. EP 20400015.2, Completed by the European Patent Office, dated Jan. 19, 2021, 8 pages.

*Primary Examiner* — Ojiako K Nwugo
(74) *Attorney, Agent, or Firm* — Brooks Kushman P.C.

(57) ABSTRACT

A measurement apparatus for determining a bending moment acting on a hollow cylindrical body in a current state as well as to a method of operating such a measurement apparatus. The measurement apparatus may include a sensor support structure, a sensor arrangement with sensors, and a processing system. The processing system may determine displacements of the inner surface of the hollow cylindrical body relative to the sensors based on the distances measured in the current state compared to the distances measured during an initial undeformed state, and determine the bending moment acting on the hollow cylindrical body based on the displacements.

15 Claims, 6 Drawing Sheets

(56) References Cited

U.S. PATENT DOCUMENTS

| | | | | |
|---|---|---|---|---|
| 2012/0303277 | A1* | 11/2012 | Fu | F03D 17/00 |
| | | | | 702/3 |
| 2013/0110414 | A1* | 5/2013 | Caponetti | F03D 7/042 |
| | | | | 702/35 |
| 2015/0028152 | A1* | 1/2015 | Eller | B64C 27/10 |
| | | | | 244/17.13 |
| 2015/0113779 | A1* | 4/2015 | Buck | G01M 5/0091 |
| | | | | 29/889.7 |
| 2015/0203189 | A1* | 7/2015 | Eller | G05D 1/0858 |
| | | | | 244/17.13 |
| 2015/0211969 | A1* | 7/2015 | Muller | G01M 11/083 |
| | | | | 73/849 |
| 2017/0284376 | A1* | 10/2017 | Buchtala | G01M 5/0033 |
| 2018/0180030 | A1* | 6/2018 | Thøgersen | G01L 5/12 |
| 2018/0328341 | A1* | 11/2018 | Li | F03D 13/10 |
| 2019/0063164 | A1* | 2/2019 | Carlsen | E21B 17/085 |
| 2020/0132052 | A1* | 4/2020 | Schmid | G01H 9/004 |
| 2020/0166135 | A1* | 5/2020 | Hoshino | F02F 5/00 |
| 2020/0200146 | A1* | 6/2020 | Von Aswege | F03D 7/0292 |
| 2020/0224640 | A1* | 7/2020 | Schmid | G01L 1/242 |
| 2020/0332733 | A1* | 10/2020 | Gehrke | F02D 41/145 |
| 2021/0079889 | A1* | 3/2021 | Li | F03D 7/042 |
| 2021/0199094 | A1* | 7/2021 | Mai | F03D 7/042 |

FOREIGN PATENT DOCUMENTS

| | | |
|---|---|---|
| EP | 1646786 A1 | 4/2006 |
| EP | 2060785 A1 | 5/2009 |
| EP | 2104843 A2 | 9/2009 |
| EP | 2182337 A2 | 5/2010 |
| WO | 200223146 A1 | 3/2002 |
| WO | 2005010358 A1 | 2/2005 |
| WO | 2008088326 A2 | 7/2008 |

* cited by examiner

MEASUREMENT APPARATUS FOR DETERMINING A BENDING MOMENT

CROSS-REFERENCE TO RELATED APPLICATIONS

This application claims priority to European patent application No. EP 20400015.2 filed on Aug. 25, 2020, the disclosure of which is incorporated in its entirety by reference herein.

BACKGROUND OF THE INVENTION

(1) Field of the Invention

The present embodiments relate to a measurement apparatus for determining a bending moment acting on a hollow cylindrical body and, more particularly, to a measurement apparatus for determining the bending moment acting on a hollow cylindrical body in a current state compared to an initial undeformed state. The present embodiments also relate to a method of operating such a measurement apparatus.

(2) Description of Related Art

Hollow cylindrical bodies that rotate around a rotational height axis (i.e., the axis that is perpendicular to the circular basis of the cylindrical body) can be found in various different applications. For example, such hollow cylindrical bodies are used as rotor shafts of a helicopter or other type of rotorcraft, as propeller shafts in propeller aircraft, as rotating shafts of a wind turbine, or as hollow axles with a wheel.

In all these applications, the hollow cylindrical body is supported or fixed at one end and free at the other end. The bodies (e.g., rotating blades or wheels) that are mounted to the free end induce various loads into the hollow cylindrical body, including bending moments.

For example, in an unarticulated construction of a rotor head, the rotation of rotor blades can deliver high bending moments into the rotor shaft. Overly high bending moments can lead to a premature fatigue of the rotor shaft or a damage of transmission parts. Therefore, a pilot may be required to monitor the bending moment acting on the rotor shaft in flight operation. For this purpose, the bending moment or a portion of the maximum allowable bending moment is usually displayed in the cockpit of a rotorcraft. Exceeding fixed boundary values in operation often leads to maintenance operations and should be avoided.

Conventionally, the bending moment in a rotor shaft is measured through strain measurements with strain gauges. These strain gauges are usually bonded, soldered, and/or cemented in the upper part of the rotor shaft. However, in operation, the strain gauges and the connection inside the rotor shaft are exposed to dynamic loads and fluctuating ambient conditions (e.g., temperature, vibrations, and moisture) and thus are highly stressed.

Since, the strain gauges are mainly installed inside the rotor shaft using complex bonding, soldering, and/or cementing processes, maintenance and repair of these strain gauges often require the complete disassembly of the rotor system and a deinstallation of the rotor shaft, which is very costly and time-consuming, leading to long ground times for the associated rotorcraft.

The documents EP 2 060 785 A1 and EP1 646 786 A1 describe a measurement apparatus with sensors that are mounted outside the hollow cylindrical shaft. However, since the hollow cylindrical body is rotating, measurement equipment that measures the bending moment of such a hollow cylindrical body cannot be readily mounted to the hollow cylindrical body itself. Also, due to rotating parts, it may not be possible to externally mount measurement equipment near the hollow cylindrical body.

The document EP 2 182 337 A2 describes a method and a device for contactless determination of forces and/or moments acting on a hollow cylindrical body, in which via a light source, light radiation is produced within the hollow cylindrical body; measurement signals are recorded by an optoelectronic sensor; the measurement signals recorded by the optoelectronic sensor are supplied to the signal processing unit; the signal processing unit detects and outputs changes of the measurement signals relative to an initial state determined beforehand by calibration, corresponding to the initial undeformed state of the hollow cylindrical body; and when a mechanical deformation of the hollow cylindrical body is present, according to a calibration function or a calculation rule, the signal processing unit outputs an output signal that describes the forces and/or moments that are causing the mechanical deformation of the hollow cylindrical body.

The document DE 10 2009 021 557 A1 describes a method that involves utilizing a camera-based optical measurement system, and receiving reference patterns by the measurement system. Images recorded by the measurement system are processed and/or evaluated, such that linear momentum is determined from an idle position of the reference patterns and/or a position of the reference patterns in a camera image during deformation of a shaft. The reference patterns are arranged at center of the shaft such that centers of the reference patterns rest on rotational axes of a rotatable shaft. The document also describes a shaft inspection—and/or monitoring device for inspecting and/or monitoring movement of a rotatable shaft.

Both of the above documents describe solutions that incur high costs for specialty measurement equipment including cost for sophisticated sensors, signal transmission and signal processing electronics, sensor installation, etc. Moreover, the respective shafts often operate in harsh environments with significant vibration loads, variation in temperatures and moisture, and the presence of oil, etc., which may adversely affect the reliability of the associated measurement apparatus.

The document EP 2 104 843 A2 describes a Hall effect helicopter mast torque meter that includes a stand pipe, a first magnet, a second magnet, and a sensor. The stand pipe is connected to the top of the mast such that the stand pipe rotates at the same velocity as the mast. The first magnet is operably associated with the stand pipe which is operably associated with the top of the mast. The second magnet is operably associated with the bottom of the mast. The sensor detects the magnetic field of the first magnet and the second magnet.

However, the described mast torque meter measures a differential torsion to determine a torque moment. Furthermore, the mast torque meter uses a stand pipe that rotates at the same velocity as the mast.

The document EP 1 317 663 A1 describes a magnetic torque sensor system. A shaft subject to torque about its axis has an axial bore. A region of the shaft has a stored magnetization, the region being permanently magnetized with circumferential magnetization about the axis or an annulus of longitudinal magnetization. The stored magnetization emanates a torque-dependent field into the bore. A magnetic field sensor arrangement is positioned in the bore to produce a torque-dependent signal. The document also describes the relationship between the radial depth of the permanent magnetization in region relative to the shaft wall thickness. Magnetic sensor placements include axial or offset arrangements of pairs of sensors. Dependent on the nature of the field to be sensed, sensors may be oriented axially, radially or tangentially with respect to the axis. The document US2010095788 was cited.

BRIEF SUMMARY OF THE INVENTION

Based on the limitations and drawbacks of the prior art, an objective is to provide a measurement apparatus for contactless determination of a bending moment acting on a hollow cylindrical body. The measurement apparatus should have low fault susceptibility relative to ambient conditions such as temperature, vibrations, and oscillations, be relatively simple, lightweight, and have low purchase and maintenance costs. The measurement apparatus should be easily accessible and replaceable, perform contactless measurements, and be insensitive to electromagnetic interference.

These objectives are solved by a measurement apparatus comprising the features of claim 1. More specifically, a measurement apparatus for determining a bending moment acting on a hollow cylindrical body, the hollow cylindrical body having an inner surface, may include a sensor support structure that is inside the hollow cylindrical body without being in contact with the inner surface; a sensor arrangement that is mounted to the sensor support structure and comprises at least first and second sensors that measure first and second distances in first and second directions between the first and second sensors and the inner surface; and a processing system that determines first and second displacements of the inner surface relative to the first and second sensors based on the first and second distances measured in a current state compared to the first and second distances measured during an initial undeformed state, and determines the bending moment acting on the hollow cylindrical body based on the first and second displacements.

Thus, the bending moment acting on the hollow cylindrical body is determined by measuring the actual bending displacement of a portion of the hollow cylindrical body. The bending displacement may be measured with inductive sensors. If desired, the inductive sensor could be conventional, off-the-shelf inductive sensors. The inductive sensors may be mounted within the hollow cylindrical body.

For example, consider the scenario in which the hollow cylindrical body is a rotor shaft of a rotorcraft. In this scenario, the sensors may be mounted in the non-rotating part of the gearbox. The sensors may be positioned within the rotor shaft using a mounting tube. If desired at least two sensors may be used. The use of at least two sensors may enable a directional measurement. Thereby, the magnitude and the angular direction of the bending moment can be determined.

Due to the non-contact measurement with sensors in the non-rotating system, no wireless signal-transmission electronics are required. Instead, a wire may transport signals from the sensors to a processing system. The processing system may include basic signal processing equipment.

The use of inductive sensors together with simplified electronic circuitry instead of bonded strain gauges with wireless signal transmission equipment leads to an increased reliability of the measurement apparatus and reduced cost compared to a conventional measurement apparatus.

The cost of such a measurement apparatus may be further reduced with a processing system that integrates different capabilities including a storage circuit, a processing circuit with an arithmetic logic unit, a display, and an alert system.

Moreover, the maintainability of the measurement system is facilitated when used in a rotorcraft. Instead of requiring the deinstallation of the rotor shaft and/or the repair by specialized personnel, the present measurement apparatus may be easily replaced using a plug-and-play approach. In fact, the sensor support structure of the present measurement apparatus may have a stand that can be installed within the non-rotating part of the gearbox. If desired, current rotorcraft may be retrofitted with the present measurement apparatus.

Furthermore, contrary to prior art solutions in which the signals between sensors and processing system requires either a transmission through a slip ring or a similar solution or through wireless signal transmission, the signals between sensors and processing system in the present measurement system may be direct conveyed by wires. Thus, the present measurement system is less sensitive to radio interferences as conventional measurement systems are due to wireless signal transmission.

According to one aspect, the processing system may further include a storage circuit that stores the first and second distances measured during the initial undeformed state; and a processing circuit that retrieves the first and second distances from the storage circuit to determine the first and second displacements.

According to one aspect, the processing circuit may further include an arithmetic logic unit that computes a first difference between the first distance measured in the current state and the first distance measured during the initial undeformed state to determine the first displacement.

According to one aspect, the processing circuit may further include at least one of a system self-test function, a calibration function that is adapted to setting a zero-point reference or signal scaling factors, or an output function that is adapted to selecting between providing analogue or digital output signals.

According to one aspect, the processing system may determine a magnitude and an angle of the bending moment.

According to one aspect, the processing system may further include a display that displays the magnitude and the angle of the bending moment.

According to one aspect, the processing system may further include an alert system that provides at least one of a visual alarm or an aural alarm when the magnitude of the bending moment is greater than a predetermined threshold value.

If desired, the processing system may further include means for determining a duration of time during which the magnitude of the bending moment is greater than the predetermined threshold value. For example, the processing system may include means for recording a first time stamp when the magnitude of the bending moment starts to exceed the predetermined threshold value and a second time stamp when the magnitude of the bending moment ceases to exceed the predetermined threshold value and determine the duration of time between the first and second time stamps.

If desired, the processing system may include means for associating the measured magnitude of the bending moment and/or the angle of the bending moment with the time at which the bending occurred. The processing system may include means for recording the information that associates the measured magnitude of the bending moment and/or the angle of the bending moment with the time at which the bending occurred. The processing system may provide the recorded information for further processing.

As an example, the processing system may provide the recorded information to a maintenance apparatus during maintenance. As another example, the processing system may provide charts showing the magnitude and angle of the recorded bending moment depending on the time.

According to one aspect, the first direction, the second direction, and a rotational height axis are perpendicular to each other.

According to one aspect, the measurement apparatus may further include a stand that non-rotationally attaches the sensor support structure outside the hollow cylindrical body.

According to one aspect, the sensor support structure may further include a cable guide that routes cables between the at least first and second sensors and the stand.

According to one aspect, the sensor support structure comprises at least one of steel, aluminum, or composites.

According to one aspect, the at least first and second sensors are selected from the group consisting of inductive sensors, optical sensors, and ultrasonic sensors.

Furthermore, a rotor may include a rotor shaft having a hollow cylindrical body with an inner surface; and the measurement apparatus for determining the bending moment acting on the hollow cylindrical body of the rotor shaft as described above.

Moreover, a rotorcraft may include a rotor with a rotor shaft having a hollow cylindrical body with an inner surface; and the measurement apparatus for determining the bending moment acting on the hollow cylindrical body of the rotor shaft of the rotor as described above.

Furthermore, a method of operating the measurement apparatus described above for determining the bending moment acting on a hollow cylindrical body, the hollow cylindrical body having an inner surface, may include the operations of: using a first sensor of the measurement apparatus to determine a first distance in a first direction between the first sensor and the inner surface during an initial undeformed state and in a current state; using a second sensor of the measurement apparatus to determine a second distance in a second direction between the second sensor and the inner surface during the initial undeformed state and in the current state; using a processing system to determine first and second displacements of the inner surface relative to the first and second sensors based on the first and second distances measured in the current state compared to the first and second distances measured during the initial undeformed state; and using the processing system to determine the bending moment acting on the hollow cylindrical body based on the first and second displacements.

BRIEF DESCRIPTION OF THE DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION OF THE INVENTION

Exemplary embodiments of a measurement apparatus may determine the bending moment acting on any hollow cylindrical body in a current state compared to an initial undeformed state. For example, the hollow cylindrical body may be subject to bending moments during a current state in which the hollow cylindrical body rotates around a rotational axis. These bending moments may be determined based on a comparison of the current state with an initial undeformed state in which the hollow cylindrical body stands still.

Hollow cylindrical bodies that rotate around a rotational height axis (i.e., an axis that is perpendicular to the circular basis of the cylindrical body) can be found in various different applications. For example, such hollow cylindrical bodies are used as rotor shafts of helicopters or other type of rotorcraft, as propeller shafts in propeller aircraft, or as rotating shafts of wind turbines, just to name a few.

It should be noted that the present embodiments are not limited to rotating hollow cylindrical bodies. Instead, any hollow cylindrical body that is subject to bending moments is likewise contemplated. For example, the present embodiments may be applied to any pylon, pole, or mast with a hollow cylindrical body that is subject to bending moments and where a monitoring of the bending moments is important to prevent structural damage to the pylon, pole, or mast.

Figure 1:
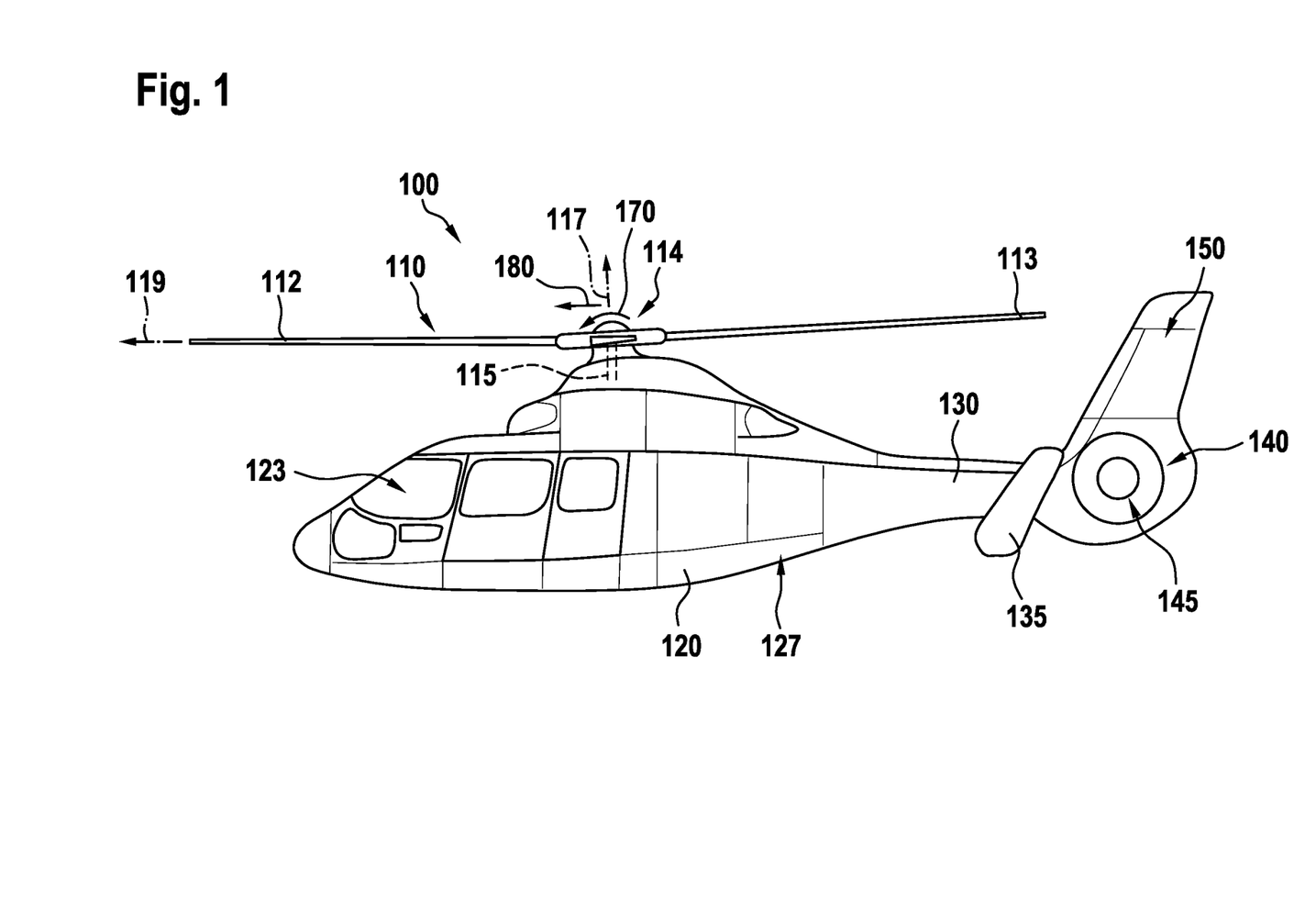
FIG. 1 is a diagram of an illustrative rotary-wing aircraft having a rotor with a rotor shaft in accordance with some embodiments.

FIG. 1 is a diagram of an illustrative rotary-wing aircraft 100 having at least one rotor 110 with a rotor shaft 115. As shown in FIG. 1, the rotary-wing aircraft 100, which is sometimes also referred to as rotorcraft 100, is exemplarily illustrated as a helicopter. Thus, for purposes of simplicity and clarity, the rotorcraft 100 is hereinafter referred to as the "helicopter" 100.

Illustratively, helicopter 100 may have a fuselage 120 that forms an airframe of the helicopter 100. The fuselage 120 is connected to a suitable landing gear and exemplarily forms a cabin 123 and a rear fuselage 127. The rear fuselage 127 is connected to a tail boom 130.

By way of example, helicopter 100 may include at least one counter-torque device 140 configured to provide counter-torque during operation, i.e., to counter the torque created by rotation of the at least one rotor 110 for purposes of balancing the helicopter 100 in terms of yaw. If desired, counter-torque device 140 may be shrouded. The at least one counter-torque device 140 is illustratively provided at an aft section of the tail boom 130 and may have a tail rotor 145. The aft section of the tail boom 130 may include a fin 150. Illustratively, the tail boom 130 may be provided with a suitable horizontal stabilizer 135.

Illustratively, helicopter 100 may have at least one rotor 110, which is illustratively provided as a multi-blade rotor 110, for providing lift and forward or backward thrust during operation. The at least one multi-blade rotor 110 comprises a plurality of rotor blades 112, 113 that are mounted at an associated rotor head 114 to a rotor shaft 115, which rotates in operation of the helicopter 100 around an associated rotor axis 117 in a rotor plane 119. The rotor shaft 115 may be in a current state when rotor blades 112, 113 rotate around rotor axis 117. The current state may be compared to an initial state when rotor blades 112, 113 stand still. The initial state may have been determined beforehand, corresponding to the initial undeformed state of the rotor shaft 115.

The rotor shaft 115 may be a hollow cylindrical body with first and second ends. Rotor blades 112, 113 may be attached to the first end of the rotor shaft 115. The second end of the rotor shaft 115 may be installed within a gearbox.

When the rotor shaft 115 is in the current state, bending moments may act on the rotor shaft 115. The bending moments may be caused by the rotation of the rotor blades 112, 113 around the rotor axis 117. The bending moments that act on the rotor shaft 115 may lead to a displacement of the rotor shaft 115 in a direction that is perpendicular to the rotor axis 117. The displacement of the rotor shaft 115 may increase with the distance from the second end of the rotor shaft 115 that is installed within the gearbox.

For a given distance from the second end of the rotor shaft 115, the magnitude of the displacement of the rotor shaft 115 in a direction that is perpendicular to the rotor axis 117 may depend on the magnitude of the bending moment acting on the rotor shaft 115 and vice versa. The relationship between the magnitude of the displacement and the magnitude of the bending moment may be used to calibrate a measurement apparatus.

For example, the magnitude of the bending moment acting on the rotor shaft 115 and the magnitude of the displacement of the rotor shaft 115 in a direction that is perpendicular to the rotor axis 117 may have a linear dependency on each other.

Thus, a measurement apparatus for determining the bending moment that acts on the rotor shaft 115 may measure the displacement of the rotor shaft 115 in a direction that is perpendicular to the rotor axis 117 and derive the bending moment of the rotor shaft 115 from the measured displacement of the rotor shaft 115. However, the measurement apparatus may only operate if a displacement of the rotor shaft 115 is smaller than the distance of the rotor shaft 115 from the measurement apparatus. Otherwise, the rotor shaft 115 may come in contact with and potentially damage the measurement apparatus. Thus, the measurement apparatus may be installed in a way that prevents a contact between the rotor shaft 115 and any sensors of the measurement apparatus.

Figure 2:
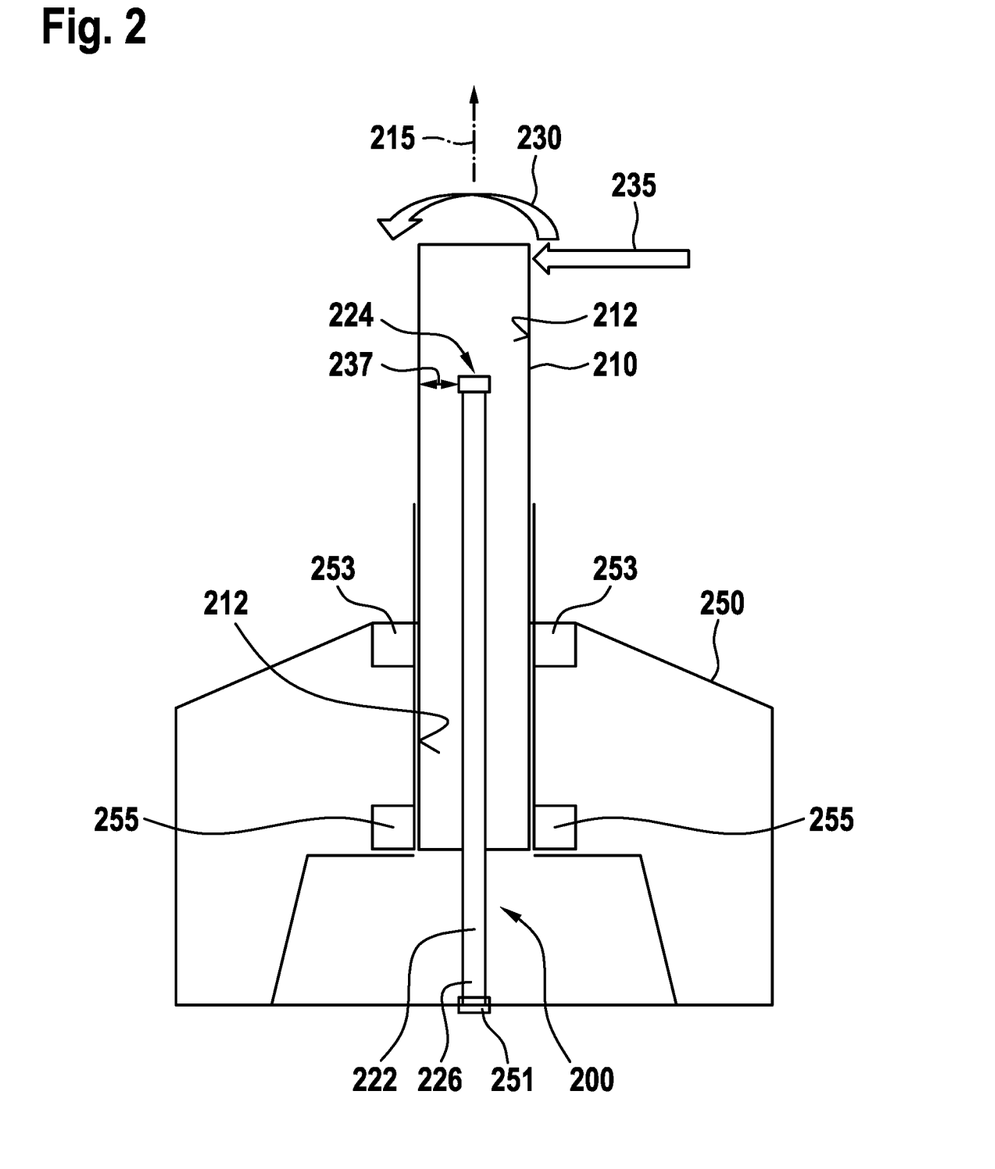
FIG. 2 is a diagram of an illustrative hollow cylindrical body and a measurement apparatus for determining a bending moment acting on the hollow cylindrical body in accordance with some embodiments.

If desired, a measurement apparatus that measures the bending moment acting on rotor shaft 115 may be installed inside rotor shaft 115. FIG. 2 shows an illustrative rotor shaft 210 with a measurement apparatus 200 for measuring the bending moment of the rotor shaft 210.

However, it should be noted that such a measuring apparatus 200 is not restricted to measuring the bending moment acting on a rotor shaft 210. Instead, the present measuring apparatus 200 may be used within any hollow cylindrical body 210 that has an axially and radially supported end, a free end, to which a bending moment is applied (e.g., caused by rotating rotor blades).

Examples for such hollow cylindrical bodies 210 include the rotor shaft 115 of rotor 110 of helicopter 100 or any other rotorcraft 100, the rotor shaft of a tail rotor, a propeller shaft of a propeller-driven aircraft, a rotating shaft of a wind turbine, etc. However, for the purpose of simplicity and conciseness, the present measurement apparatus 200 is hereinafter described as being used to measure the bending moment acting on the rotor shaft of a rotor of a rotorcraft such as rotor shaft 115 of rotor 110 of helicopter 100 of FIG. 1.

As shown in FIG. 2, rotor shaft 210 may be a hollow cylindrical body 210 with an inner surface 212. Rotor shaft 210 may rotate around rotational height axis 215.

When the rotor shaft 210 rotates around rotational height axis 215, the rotor shaft 210 is sometimes also referred to as being in a dynamic state or current state. When the rotor shaft 210 stands still (i.e., when the rotor shaft 210 is not rotating), the rotor shaft 210 is sometimes also referred to as being in a static state. When the rotor shaft 210 stands still and no bending moments are acting on the rotor shaft 210, the rotor shaft 210 is sometimes also referred to as being in an initial undeformed state.

Illustratively, rotor shaft 210 may have an attached end and a free end. The attached end of rotor shaft 210 may be installed within a gearbox 250. For example, rotor shaft 210 may be rotatively attached to gearbox 250 at upper and lower bearings 253, 255.

By way of example, rotor blades, such as rotor blades 112, 113 of FIG. 1 may be attached to the free end of rotor shaft 210. In operation, rotor shaft 210 may rotate around rotational height axis 215. The rotating blades may induce various different loads to rotor shaft 210. For example, linear loads 235 or bending moments 230 may be induced into rotor shaft 210.

If desired, measurement apparatus 200 may be provided for determining the bending moment 230 that acts on the hollow cylindrical body 210 that forms the rotor shaft. Measurement apparatus 200 may include a sensor support structure 222 that is placed inside the hollow cylindrical body 210 without being in contact with the inner surface 212 of the hollow cylindrical body 210.

A sensor arrangement 224 may be mounted to the sensor support structure 222. The sensor arrangement 224 may include at least one sensor. A sensor arrangement 224 with only one sensor may determine a bending moment acting on the hollow cylindrical body 210 in a predetermined direction.

For example, the sensor may measure respective distances between the sensor of sensor arrangement 224 and the inner surface 212 of the hollow cylindrical body 210 during an initial undeformed state and in the current state.

If desired, the sensor arrangement 224 may include at least two sensors that measure at least two displacements in at least two different directions between the at least two sensors and the inner surface 212 of the hollow cylindrical body 210.

For example, the at least two sensors may measure respective distances between the sensors of sensor arrangement 224 and the inner surface 212 of the hollow cylindrical body 210 during an initial undeformed state and respective distances between the sensors and the inner surface 212 of the hollow cylindrical body 210 in the current state.

Figure 6A:
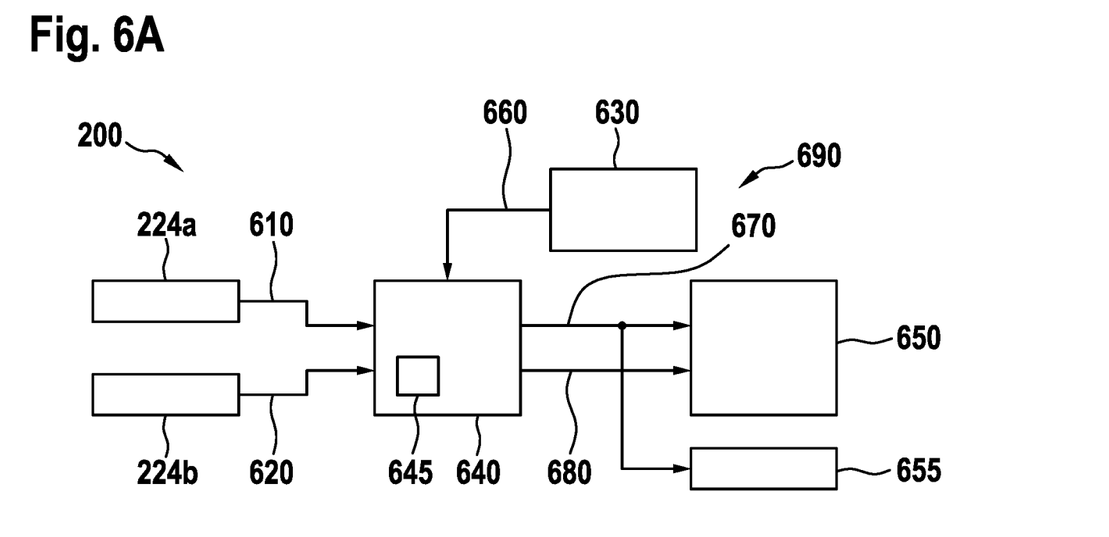
FIG. 6A is a diagram of an illustrative processing system of an illustrative measurement system in accordance with some embodiments.
Figure 6B:
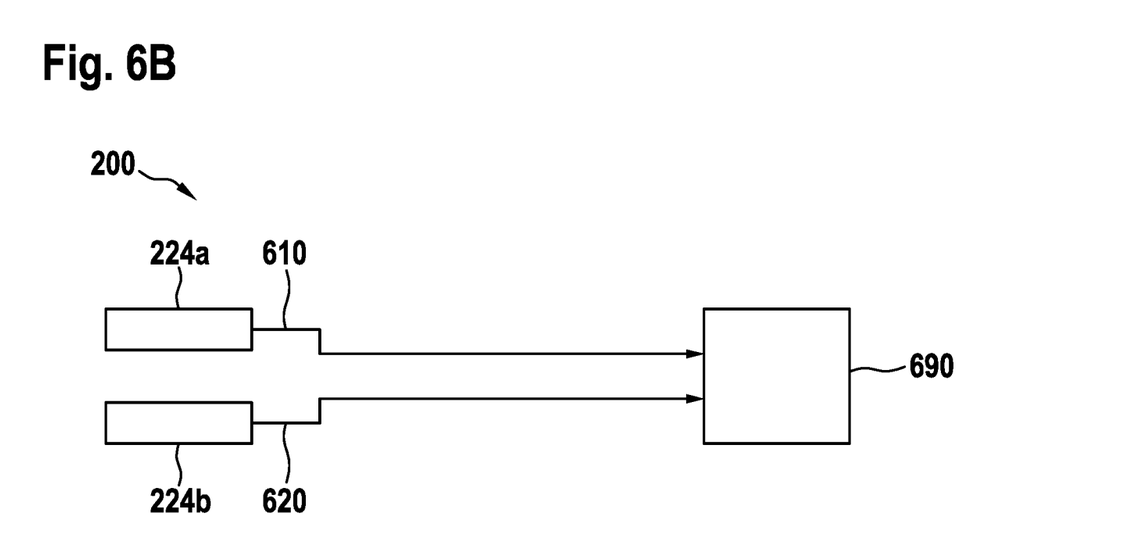
FIG. 6B is a diagram of an illustrative processing system with integrated components in accordance with some embodiments.

Measurement apparatus 200 may include a processing system as described in more detail in FIGS. 6A and 6B. The processing system may determine respective displacements 237 of the inner surface 212 relative to the at least two sensors based on the distances measured in the current state compared to the distances measured during the initial undeformed state. The processing system may determine the bending moment acting on the hollow cylindrical body 210 based on the respective displacements 237, if desired.

Illustratively, measurement apparatus 200 may include a stand that is connected with gearbox cover 251. If desired, gearbox cover 251 may serve as stand for measurement apparatus 200. The stand may non-rotationally (e.g., fixedly) attach sensor support structure 222 outside the hollow cylindrical body 210.

If desired, sensor support structure 222 may include a cable guide 226 that routes cables between the sensor arrangement 224 and the gearbox cover 251. Illustratively, measurement apparatus 200 may include a processing system (e.g., processing system 690 of FIGS. 6A and 6B). Cables may connect sensors of sensor arrangement 224 via cable guide 226 with the processing system.

Sensor support structure 222 may be made from any material that provides for a low fault susceptibility relative to ambient conditions such as temperature, vibrations, and oscillations. As an example, the sensor support structure 222 may be made out of steel. As another example, the sensor support structure 222 may be made out of aluminum. As yet another example, the sensor support structure 222 may be made out of a composite material. If desired, the sensor support structure 222 may be made from a combination of materials including at least one of steel, aluminum, or composite materials.

Figure 3:
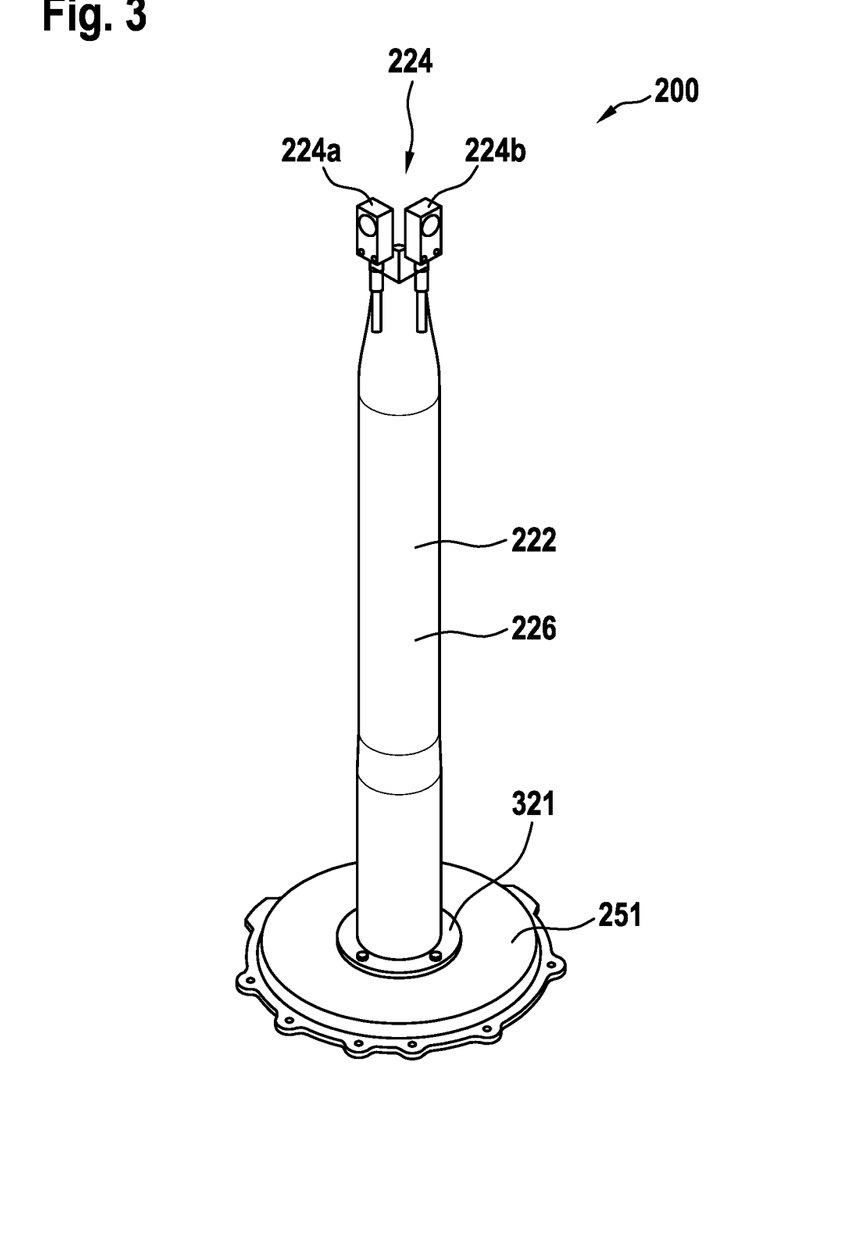
FIG. 3 is a diagram of an illustrative measurement apparatus with a sensor support structure and a sensor arrangement in accordance with some embodiments.

FIG. 3 is a diagram of an illustrative measurement apparatus 200 with a sensor support structure 222 and a sensor arrangement 224 in accordance with some embodiments. As shown in FIG. 3, the sensor arrangement 224 that is mounted to the sensor support structure 222 may include at least first and second sensors 224a, 224b.

The at least first and second sensors 224a, 224b may measure first and second distances from the inner surface of a hollow cylindrical body (e.g., inner surface 212 of hollow cylindrical body 210 of FIG. 2) in first and second directions. The first and second directions may be perpendicular to each other and to the rotational height axis of the hollow cylindrical body, if desired.

Illustratively, measurement apparatus 200 may include a stand 321. The stand 321 may non-rotationally attach the sensor support structure 222 outside the hollow cylindrical body. For example, stand 321 may attach sensor support structure 222 to gearbox cover 251. Thus, the sensor support structure 222 and the sensor arrangement 224 may be removed and reinstalled along with the gearbox cover 251.

By way of example, sensor support structure 222 may include a cable guide 226. Cable guide 226 may route cables between the first and second sensors 224a, 224b and the stand 321. If desired, the cables may be connected with a processing system (e.g., processing system 690 of FIG. 6A or FIG. 6B). As an example, the processing system may be installed in the stand 321. As another example, the processing system may be installed separately from the sensor support structure 222 and the stand 321.

As shown in FIG. 3, sensor support structure 222 may have a cylindrical shape with a quadratic profile in the area of the sensor arrangement 224. However, sensor support structure 222 may have any shape that is adapted to place sensors 224a, 224b inside the hollow cylindrical body for which the measurement apparatus determines the bending moment. For example, sensor support structure 222 may have a conical shape, a cylindrical shape, a polyhedral shape, an I-beam profile shape, a T-beam profile shape, a U-beam profile shape, or any combination thereof.

Sensor support structure 222 may be made from any material that is resistant in environments characterized by changing temperatures, vibrations, and oscillations. For example, the sensor support structure 222 may be made out of a metal such as steel or aluminum, out of a composite material such as carbon fiber, or out of any combination thereof. Preferably, sensor support structures 222 that are used in high-temperature applications may comprise at least a metal such as steel or aluminum.

Figure 4:
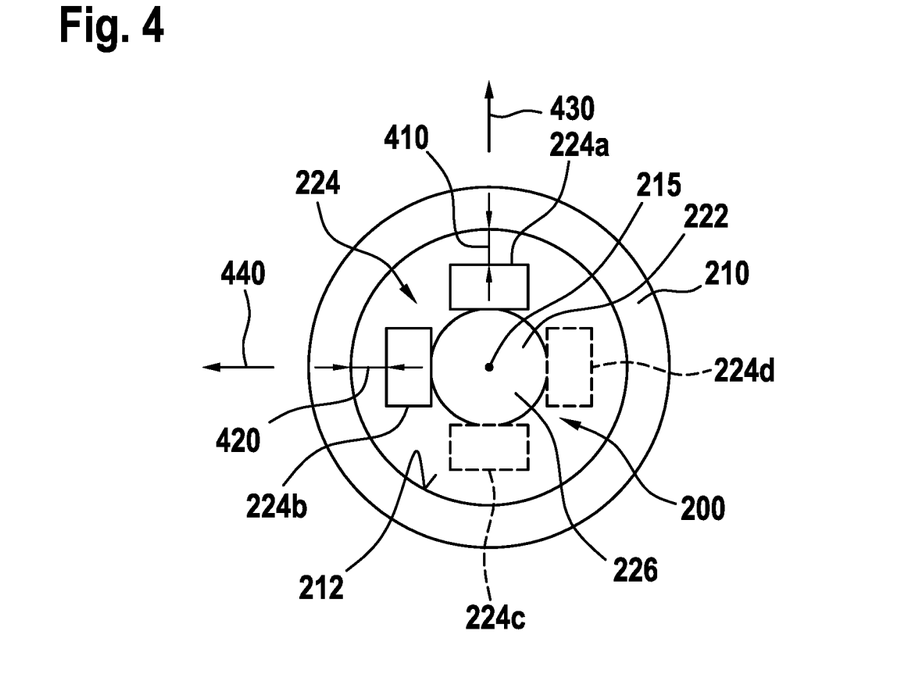
FIG. 4 is a diagram of an illustrative measurement apparatus inside a hollow cylindrical body in accordance with some embodiments.

FIG. 4 is a diagram of an illustrative measurement apparatus 200 inside a hollow cylindrical body 210 in accordance with some embodiments. Hollow cylindrical body 210 may have an inner surface 212 and a predetermined thickness.

Hollow cylindrical body 210 may rotate around a rotational height axis 215 in a current state. Hollow cylindrical body 210 may not be rotating in an initial undeformed state. Hollow cylindrical body 210 may be subject to bending moments. The bending moments may be perpendicular to the rotational height axis 215.

Measurement apparatus 200 may be adapted to determining the bending moment that act on the hollow cylindrical body 210. Illustratively, measurement apparatus 200 may include sensor support structure 222. The sensor support structure 222 may be inside the hollow cylindrical body 210 without being in contact with the inner surface 212. The sensor support structure 222 may be installed non-rotationally, and the hollow cylindrical body 210 may rotate around the sensor support structure 222.

By way of example, measurement apparatus 200 may include a sensor arrangement 224. Sensor arrangement 224 may be mounted to the sensor support structure 222.

Illustratively, sensor arrangement 224 may include at least first and second sensors 224a, 224b. If desired, the at least first and second sensors 224a, 224b may be inductive sensors if the hollow cylindrical body 210 is made of a metal that interacts with a magnetic field.

Alternatively, the at least first and second sensors 224a, 224b may be inductive sensors and the hollow cylindrical body 210 may be coated with a metal that interacts with a magnetic field at least in the vicinity of the at least first and second sensors 224a, 224b, such that a change in first and second distances 410, 420 between the first and second sensors 224a, 224b and the inner surface 212 can be detected by the inductive sensors.

First and second sensors 224a, 224b may measure first and second distances 410, 420 in first and second directions 430, 440 between the first and second sensors 224a, 224b and the inner surface 212. The first direction 430, the second direction 440, and the rotational height axis 215 may be perpendicular to each other.

A change in first and second distances 410, 420 measured in the current state compared to the first and second distances 410, 420 measured during the initial undeformed state may correspond to the first and second displacements of the inner surface 212 relative to the first and second sensors 224a, 224b.

When the hollow cylindrical body 210 is subject to a bending moment, the first and second distances 410, 420 between the first and second sensors 224a, 224b increases or decreases depending on the direction of the first and second displacements caused by the bending moment.

The magnitude and the angular direction of the bending moment may be determined based on the first and second displacements (e.g., based on vectoral addition) if at least two sensors 224a, 224b are used to determine the first and second displacements in the first and second directions 430, 440 and when the first and second directions 430, 440 are perpendicular to each other and to the rotational height axis 215.

If desired, sensor arrangement 224 may include more than two sensors. For example, sensor arrangement 224 may include four sensors 224a, 224b, 224c, 224d. The four sensors 224a, 224b, 224c, 224d may measure distances between the respective sensors and the inside surface 212 of the hollow cylindrical body 210 in different directions.

Figure 5:
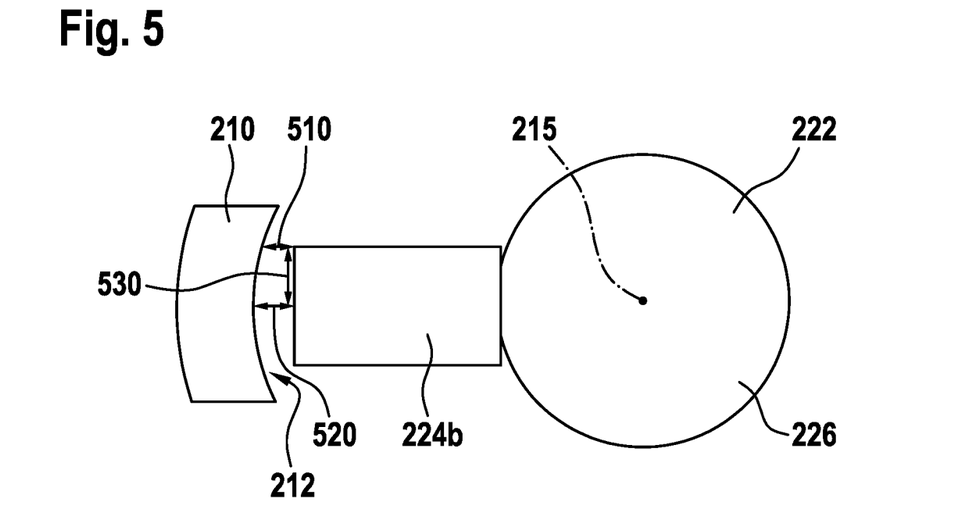
FIG. 5 is a diagram of a portion of the illustrative measurement apparatus of FIG. 4 in accordance with some embodiments.

FIG. 5 is a diagram of a portion of the illustrative measurement apparatus of FIG. 4. In fact, only sensor support structure 222 with cable guide 226, sensor 224b of sensor arrangement 224 of FIG. 4, and a portion of the hollow cylindrical body 210 is shown in FIG. 5.

As shown in FIG. 5, the distance that the sensor 224b measures between sensor 224b and hollow cylindrical body 210 (i.e., measured distance 510) may be different than the actual distance 520 of the sensor 224b from the hollow cylindrical body 210. Thus, the measured distance 510 and thereby the sensor output signal may depend on the nominal distance between sensor 224b and hollow cylindrical body 210, on the sensor width, and on the shape of the hollow cylindrical body 210.

For example, the measured distance 510 may be the shortest distance between the sensor 224b and the hollow cylindrical body 210, while the actual distance 520 may be the distance between the middle of the sensor 224b and the hollow cylindrical body 210. In other words, the actual distance 520 and the nominal distance 510 may be measured at two different points on the sensor 224b that are about half of the sensor width 530 away from each other.

If desired, the measurement apparatus 200 may include a processing system. The processing system may determine the actual distance 520 based on the measured distance 510. For example, consider the scenario in which the hollow cylindrical body 210 has a radius r between the rotational height axis 215 and the inner surface 212. Consider further, that w is half the sensor width 530, m the measured distance, and a the actual distance. In this scenario, the actual distance can be determined as $a = r + m - \sqrt{r^2 - w^2}$.

FIG. 6A is a diagram of an illustrative processing system 690 of an illustrative measurement system 200 in accordance with some embodiments. Processing system 690 may be connected with sensors 224a, 224b. As an example, processing system 690 may be connected via cables with sensors 224a, 224b. As another example, processing system 690 may connected wirelessly with sensors 224a, 224b. If desired, sensors 224a, 224b and processing system 690 may be connected by wire and wirelessly. Illustratively, processing system 690 may supply sensors 224a, 224b with power.

Sensors 224a, 224b may be placed inside a hollow cylindrical body (e.g., as shown in FIG. 4) and measure a distance from the inside surface of the hollow cylindrical body. Sensors 224a, 224b may send the measured distances 610, 620 to processing system 690.

For example, sensor 224a may measure a first distance (e.g., distance 410 of FIG. 4) from the inside surface of the hollow cylindrical body in a first direction when the hollow cylindrical body is in an initial undeformed state (e.g., standing still) and send the measured distance 610 to processing system 690.

Similarly, sensor 224b may measure a second distance (e.g., distance 420 of FIG. 4) from the inside surface of the hollow cylindrical body in a second direction that is different than the first direction when the hollow cylindrical body is in an initial undeformed state (e.g., standing still) and send the measured distance 620 to processing system 690.

If desired, first and second distances 610, 620 may be measured during a calibration of processing system 690. The calibration of processing system 690 may include the setting of a zero-point reference or of signal scaling factors, if desired.

Processing system 690 may include a storage circuit 630. Storage circuit 630 may store the distances 610, 620 measured during the initial undeformed state.

Illustratively, processing system 690 may include a processing circuit 640. Processing circuit 640 may retrieve data 660 from the storage circuit 630. For example, processing circuit 640 may retrieve the first and second distances measured during the initial undeformed state from the storage circuit 630.

If desired, processing circuit 640 may determine first and second displacements based on the first and second distances measured in the initial undeformed state. For example, processing circuit 640 may include an arithmetic logic unit (ALU) 645. Sensor 224a, 224b may measure first and second distances (e.g., distances 410, 420 of FIG. 4) from the inside surface of the hollow cylindrical body in first and second directions when the hollow cylindrical body is in a current state (i.e., rotating around a rotational axis such as rotational height axis 215 of FIG. 4) and send the measured distances 610, 620 to processing circuit 640.

Arithmetic logic unit 645 may compute a first difference between the first distance 610 measured in the current state and the first distance measured in the initial undeformed state and retrieved from storage circuit 630 to determine the first displacement. If desired, arithmetic logic unit 645 may compute a second difference between the second distance 620 measured in the current state and the second distance measured in the during an initial undeformed state and retrieved from storage circuit 630 to determine the second displacement.

Illustratively, processing system 690 may determine a magnitude 670 and an angle 680 of the bending moment. For example, processing circuit 640 may determine magnitude 670 and angle 680 of the bending moment based on the first and second displacements.

As an example, storage circuit 630 may store a lookup table with bending moment magnitude and angle depending on first and second displacements and processing circuit 640 may use the lookup table to retrieve the bending moment magnitude and angle that correspond to the determined first and second displacements.

As another example, processing circuit 640 may use arithmetic logic unit 645 to compute magnitude and angle of the bending moment based on a functional relationship between bending moment and first and second displacements (e.g., a functional relationship that was determined during calibration of the measurement apparatus).

Illustratively, processing system 690 may include a display 650. Display 650 may display the magnitude 670 and the angle 680 of the bending moment. If desired, processing system 690 may include an alert system 655. The alert system may provide at least one of a visual alarm or an aural alarm when the magnitude 670 of the bending moment is greater than a predetermined threshold value. As an example, the alert system 655 may sound a siren or make a clear voice announcement. As another example, the alert system 655 may flash a screen or display a message on a screen.

By way of example, the processing system 690 may record a first time stamp in storage circuit 630 when the magnitude of the bending moment starts to exceed the predetermined threshold value and a second time stamp when the magnitude of the bending moment ceases to exceed the predetermined threshold value. The processing circuit 640 may retrieve the first and second time stamps from the storage circuit 630 and determine the duration of time between the first and second time stamps (e.g., using the arithmetic logic unit 645).

If desired, the processing circuit 640 may further process and analyze the recorded information. For example, processing circuit 640 may sample the magnitude 670 of the bending moment in predetermined ranges over the duration of time between the first and second time stamps. Display 650 may display the predetermined ranges of the magnitude 670 of the bending moment depending on the time.

If desired, the processing system 690 may provide the recorded information from the storage circuit 630 for further processing. As an example, the processing system 690 may provide the recorded information to a maintenance apparatus during maintenance. As another example, the processing system 690 may provide charts showing the magnitude and angle of the recorded bending moment depending on the time.

If desired, processing circuit 640 may include at least one of a system self-test function, a calibration function that is adapted to setting a zero-point reference or signal scaling factors, or an output function that is adapted to selecting between providing analogue or digital output signals.

The processing system 690 may be implemented using different discrete components. As shown in FIG. 6A, the discrete components may include a storage circuit 630, a processing circuit 640, a display 650, and an alert system 655.

If desired, some or all discrete components of FIG. 6A may be combined and integrated inside a single component. As an example, alert system 655 may be integrated into a display 650 with speakers. As another example, processing circuit 640 may have embedded memory circuitry, thereby combining processing circuit 640 and storage circuit 630. FIG. 6B is a diagram of an illustrative processing system 690 in which all components are integrated inside processing system 690.

Figure 7:
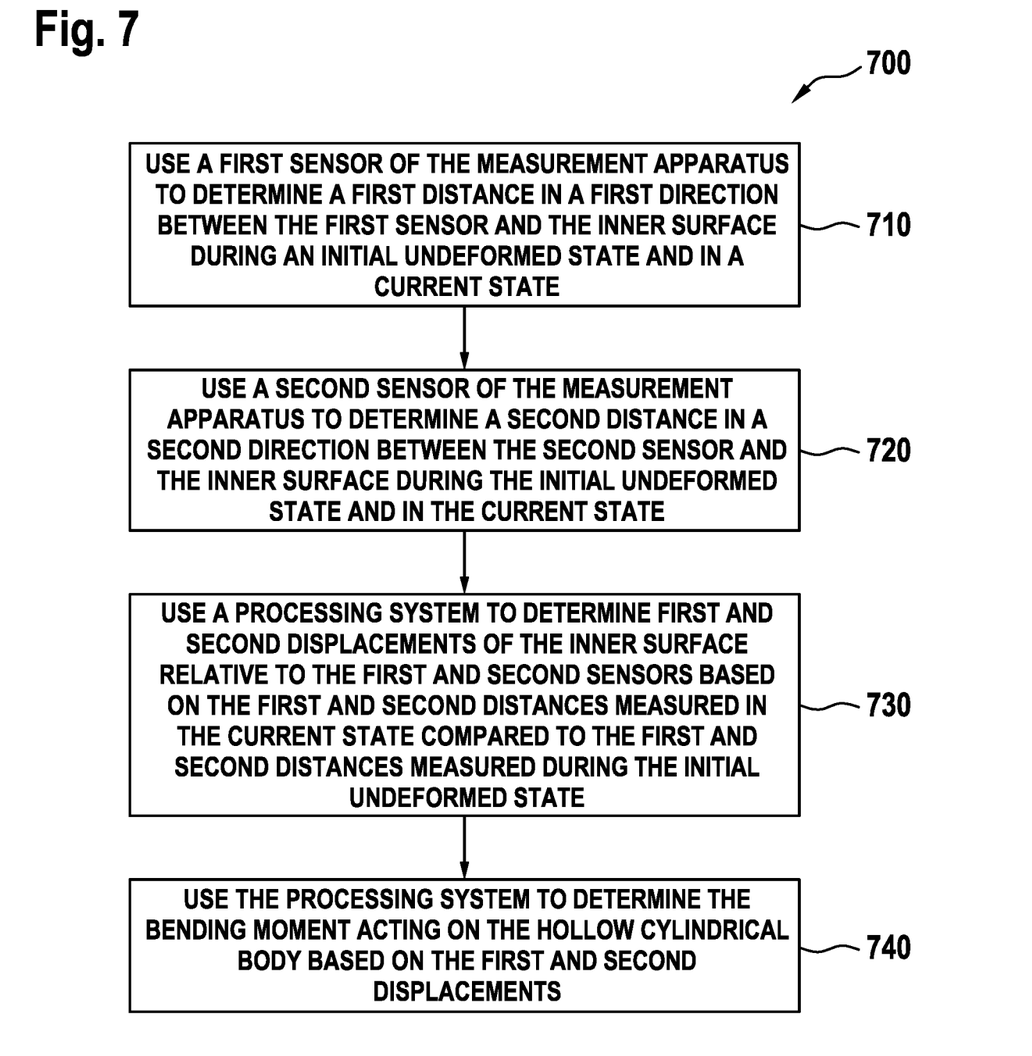
FIG. 7 is a flowchart showing illustrative operations that a measurement apparatus may perform to determine the bending moment acting on a hollow cylindrical body in accordance with some embodiments.

FIG. 7 is a flowchart 700 showing illustrative operations that a measurement apparatus such as measurement apparatus 200 of FIGS. 2 to 6B may perform to determine the bending moment acting on a hollow cylindrical body. The hollow cylindrical body may have an inner surface. For example, hollow cylindrical body 210 of FIG. 4 may have inner surface 212.

During operation 710, the measurement apparatus may use a first sensor of the measurement apparatus to determine a first distance in a first direction between the first sensor and the inner surface during an initial undeformed state and in a current state.

For example, measurement apparatus 200 of FIG. 4 may use first sensor 224a of the measurement apparatus 200 to determine a first distance 410 in a first direction 430 between the first sensor 224a and the inner surface 212 during the initial undeformed state and in the current state. Illustratively, measurement apparatus 200 may determine a first distance 410 when the hollow cylindrical body 210 stands still and determine another first distance 410 when the hollow cylindrical body 210 rotates around the rotational height axis 215. If desired, processing system 690 of the measurement system 200 may store the first distance 410 that was measured when the hollow cylindrical body stands still in storage circuit 630.

During operation 720, the measurement apparatus may use a second sensor of the measurement apparatus to determine a second distance in a second direction between the second sensor and the inner surface during the initial undeformed state and in the current state.

For example, measurement apparatus 200 of FIG. 4 may use second sensor 224b of the measurement apparatus 200 to determine a second distance 420 in a second direction 440 between the second sensor 224b and the inner surface 212 in the initial undeformed state and in the current state. Illustratively, measurement apparatus 200 may determine a second distance 420 when the hollow cylindrical body 210 stands still and determine another second distance 420 when the hollow cylindrical body 210 rotates around the rotational height axis 215. If desired, processing system 690 of the measurement system 200 may store the second distance 420 that was measured when the hollow cylindrical body stands still in storage circuit 630.

During operation 730, the measurement apparatus may use a processing system to determine first and second displacements of the inner surface relative to the first and second sensors based on the first and second distances measured in the current state compared to the first and second distances measured during the initial undeformed state.

For example, measurement apparatus 200 of FIG. 4 may use a processing system 690 of FIG. 6A or 6B to determine first and second displacements of the inner surface 212 relative to the first and second sensors 224a, 224b based on the first and second distances 410, 420 measured in the current state compared to the first and second distances 410, 420 measured in the initial undeformed state. As an example, processing system 690 may retrieve the first and second distances 410, 420 that were measured in the initial undeformed state from storage circuit 630 and subtract the retrieved first and second distances 410, 420 from the first and second distances 410, 420 measured in the current state to determine first and second displacements.

During operation 740, the measurement apparatus may use the processing system to determine the bending moment acting on the hollow cylindrical body based on the first and second displacements.

For example, measurement apparatus 200 of FIG. 2 may use the processing system 690 of FIG. 6A or 6B to determine the bending moment 230 acting on the hollow cylindrical body 210 based on the first and second displacements. As an example, processing system 690 may have stored a lookup table with a relationship between displacements and bending moments (e.g., a table with measurement values from calibration) and retrieve the bending moment that is associated with a given displacement. As another example, processing system 690 may include a functional relationship between bending moment and displacement and compute the bending moment that is associated with a given displacement.

If desired, during an additional, optional operation, the measurement apparatus may use the processing system to record the bending moment and the time spent in different bending moment ranges.

For example, measurement system 200 of FIG. 2 may use the processing system 690 of FIG. 6A to record the bending moment and the time spent in different bending moment ranges in storage circuit 630.

Furthermore, during another additional, optional operation, the measurement apparatus may use a display to show the current magnitude of the bending moment, the current angle of the bending moment, and/or the current duration of the bending moment in the current range.

For example, measurement system 200 of FIG. 2 may use the processing system 690 of FIG. 6A or 6B to show the current magnitude of the bending moment, the current angle of the bending moment, and/or the current duration of the bending moment in the current range on display 650.

Moreover, during yet another additional, optional operation, the measurement apparatus may use an alert system to provide visual and/or audible alerts when the current magnitude of the bending moment exceeds a predetermined threshold.

For example, measurement system 200 of FIG. 2 may use alert system 655 of processing system 690 of FIG. 6A to provide visual and/or audible alerts when the current magnitude of the bending moment exceeds a predetermined threshold.

It should be noted that the above described embodiments are merely described to illustrate possible embodiments of the present invention, but not in order to restrict the present invention thereto. Instead, multiple modifications and variations of the above described embodiments are possible and should, therefore, also be considered as being part of the invention.

For instance, the measurement apparatus described above in FIGS. 2 to 6B determines the bending moment in a hollow cylindrical body. However, the body may not need to be entirely cylindrical with the same diameter throughout the entire length of the body. Instead, the diameter of the body could change as long as the relationship between the displacements in first and second direction and the bending moments has been determined experimentally previously or is otherwise known such that the processing system may determine the bending moment based on the displacements.

Furthermore, the measured distance 510 of FIG. 5 is shown as the shortest distance between the sensor and the inside surface of the hollow cylindrical body. Thus, the measured distance may depend on the shape of the sensor, which may be different than shown in FIG. 5. Furthermore, the measured distance between the sensor and the inside surface of the hollow cylindrical body may change with the type of sensor. For example, the measured distance may be determined in the middle of the sensor.

REFERENCE LIST 100 rotary-wing aircraft, rotorcraft, helicopter
110 multi-blade rotor
112, 113 rotor blades
114 rotor head
115 rotor shaft
117 rotor axis
119 rotor plane
120 fuselage
123 cabin
127 rear fuselage
130 tail boom
135 horizontal stabilizer
140 counter-torque device
145 tail rotor
150 fin
200 measuring apparatus
210 rotor shaft, rotor mast, hollow cylindrical body
212 inner surface
215 rotational height axis
222 sensor support structure
224 sensor arrangement
224a, 224b, 224c, 224d sensor
226 cable guide
230 bending moments
235 linear load
237 displacement
250 gearbox
251 gearbox cover
253 upper bearing
255 lower bearing
321 stand
410, 420 distance
430, 440 direction
510 measured distance
520 actual distance
530 half of sensor width
610, 620 measured distance
630 storage circuit
640 processing circuit
645 arithmetic logic unit
650 display
655 alert system
660 retrieved data
670 bending moment magnitude
680 bending moment angle
690 processing system
700 flowchart
710, 720, 730, 740 operation

What is claimed is:

1. A measurement apparatus for determining a bending moment acting on a hollow cylindrical body, the hollow cylindrical body having an inner surface, comprising:
   a sensor support structure that is inside the hollow cylindrical body without being in contact with the inner surface;
   a sensor arrangement that is mounted to the sensor support structure and comprises at least first and second sensors that measure first and second distances in first and second directions between the first and second sensors and the inner surface; and
   a processing system that determines first and second displacements of the inner surface relative to the first and second sensors based on the first and second distances measured in a current state compared to the first and second distances measured during an initial undeformed state, and determines the bending moment acting on the hollow cylindrical body based on the first and second displacements.

2. The measurement apparatus of claim 1, wherein the processing system further comprises:
   a storage circuit that stores the first and second distances measured during the initial undeformed state; and
   a processing circuit that retrieves the first and second distances from the storage circuit to determine the first and second displacements.

3. The measurement apparatus of claim 2, wherein the processing circuit further comprises:
   an arithmetic logic unit that computes a first difference between the first distance measured in the current state and the first distance measured during the initial undeformed state to determine the first displacement.

4. The measurement apparatus of claim 2, wherein the processing circuit further comprises:
   at least one of a system self-test function, a calibration function that is adapted to setting a zero-point reference or signal scaling factors, or an output function that is adapted to selecting between providing analogue or digital output signals.

5. The measurement apparatus of claim 1, wherein the processing system determines a magnitude and an angle of the bending moment.

6. The measurement apparatus of claim 5, wherein the processing system further comprises:
a display that displays the magnitude and the angle of the bending moment.

7. The measurement apparatus of claim 5, wherein the processing system further comprises:
an alert system that provides at least one of a visual alarm or an aural alarm when the magnitude of the bending moment is greater than a predetermined threshold value.

8. The measurement apparatus of claim 1, wherein the first direction, the second direction, and a rotational height axis are perpendicular to each other.

9. The measurement apparatus of claim 1, further comprising:
a stand that non-rotationally attaches the sensor support structure outside the hollow cylindrical body.

10. The measurement apparatus of claim 9, wherein the sensor support structure further comprises:
a cable guide that routes cables between the at least first and second sensors and the stand.

11. The measurement apparatus of claim 1, wherein the sensor support structure comprises at least one of steel, aluminum, or composites.

12. The measurement apparatus of claim 1, wherein the at least first and second sensors are selected from the group consisting of inductive sensors, optical sensors, and ultrasonic sensors.

13. A rotor, comprising:
a rotor shaft having a hollow cylindrical body with an inner surface; and
the measurement apparatus for determining the bending moment acting on the hollow cylindrical body of the rotor shaft of claim 1.

14. A rotorcraft comprising:
a rotor with a rotor shaft having a hollow cylindrical body with an inner surface; and
the measurement apparatus for determining the bending moment acting on the hollow cylindrical body of the rotor shaft of the rotor of claim 1.

15. A method of operating the measurement apparatus of claim 1 for determining the bending moment acting on a hollow cylindrical body, the hollow cylindrical body having an inner surface, comprising:
using a first sensor of the measurement apparatus to determine a first distance in a first direction between the first sensor and the inner surface during an initial undeformed state and in a current state;
using a second sensor of the measurement apparatus to determine a second distance in a second direction between the second sensor and the inner surface during the initial undeformed state and in the current state;
using a processing system to determine first and second displacements of the inner surface relative to the first and second sensors based on the first and second distances measured in the current state compared to the first and second distances measured during the initial undeformed state; and
using the processing system to determine the bending moment acting on the hollow cylindrical body based on the first and second displacements.

* * * * *